United States Patent [19]

Holchuk

[11] 4,420,192
[45] Dec. 13, 1983

[54] WALKING WHEEL

[76] Inventor: Leonard J. Holchuk, 2053 Lake St., Elmira, N.Y. 14901

[21] Appl. No.: 266,755

[22] Filed: May 26, 1981

[51] Int. Cl.³ .................... B60B 15/18; B60C 7/00
[52] U.S. Cl. ........................................ 305/5; 152/290
[58] Field of Search ............... 152/5, 13, 14, 15, 289, 152/290, 291, 292, 295; 301/48, 49, 50, 51; 305/4, 5, 11

[56] References Cited

U.S. PATENT DOCUMENTS

| | | | |
|---|---|---|---|
| 1,274,974 | 8/1918 | Bergstrom | 152/290 |
| 1,278,671 | 9/1918 | Johnson | 152/290 X |
| 1,413,608 | 4/1922 | Overboe | 152/291 |
| 1,469,393 | 8/1923 | O'Connor | 152/14 |
| 1,939,477 | 12/1933 | West | 152/290 X |
| 2,426,704 | 9/1947 | Murphy | 152/290 |
| 4,108,231 | 8/1978 | Holchuk | 152/290 |

*Primary Examiner*—Joseph J. Rolla
*Assistant Examiner*—Michael S. Huppert

[57] ABSTRACT

Disclosed is a wheel having two staggered rows of surface-gripping, radially-yielding feet. When the wheel encounters an obstacle, a spring compresses, thereby permitting the feet to deflect and absorb shock that would have otherwise been imparted to the vehicle. Each foot has a longitudinally-extending slot having a rubber stop at one end thereof. A plate mounted on the wheel extends into the slot. As a foot springs outwardly, the plate slides in the slot until it contacts the rubber stop, thus preventing further radial movement of the foot. A set of rollers mounted forward and rearward of each foot ride in a corresponding set of slots on the adjacent foot surface to reduce wear.

8 Claims, 6 Drawing Figures

4,420,192

WALKING WHEEL

BACKGROUND OF THE INVENTION

This invention relates to wheels for land vehicles and more particularly to wheels having spring-biased feet that retract when in contact with a road or other traveled surface. Such wheels are especially useful on vehicles for operating on rough terrain such as farm, construction and military equipment.

Spring wheels have been designed for use on automobiles, trucks and the like wherein the main consideration has been the provision of proper resiliency for smooth riding. Such wheels usually embody a tread portion formed of sections arranged end-to-end circumfirentially of the wheel and yieldingly supported for independent inward movement to obtain a cushioning effect. These prior art wheels are merely intended to be substitutes for pneumatic tires, the feet thereof exihibiting a minimum amount of deflection. These wheels are therefore of limited utility over rough terrain.

In my U.S. Pat. No. 4,108,231 there is disclosed a wheel comprising a hub and means defining a plurality of chambers equally spaced around the hub. A foot, which is disposed in each chamber, is capable of radial movement therein, that portion of each foot nearest the hub having at least one cavity therein. Means including a threaded rod are provided for restricting the movement of each of the feet beyond a predetermined distance from the hub so that those portions of the feet remote from the hub tend to lie in a substantially circular arc. At least one spring is disposed between each foot and the hub, one end of the spring being fixedly mounted with respect to the hub and the other end being disposed within the cavity of the associated foot. To remove a foot to replace a spring, for example, the tread had to be removed and the threaded rod had to be removed. This was a somewhat time consuming task. Furthermore, it was found that the forward and rearward surfaces of the chamber walls caused wear on the adjacent surfaces of the feet.

SUMMARY OF THE INVENTION

It is therefore an object of the present invention to provide a spring wheel that is easily disassembled. Another object is to provide a spring wheel which experiences minimal wearing of foot surfaces during use.

The wheel of the present invention is of the type that comprises a hub and means around the hub defining a plurality of equally spaced chambers. A foot, which is capable of radial movement, is disposed in each chamber. Each foot is provided with means to restrict movement thereof beyond a predetermined distance from the hub. At least one spring is disposed between each foot and the hub, thereby forcing the foot outwardly from the hub. The present invention is characterized in that the means for restricting movement of the foot comprises a locking slot in the sidewall of each foot, which slot has an end wall. A plate fixedly mounted on the wheel extends into the locking slot.

DETAILED DESCRIPTION

It is noted that the drawings are for the purpose of illustration only, and they are not intended to be drawn to scale. It should be understood that wheels having any number of feet are contemplated by this invention, and indeed, wheels having a greater number of feet than the number illustrated would be capable of providing smoother operation over any type of terrain.

Figure 1:
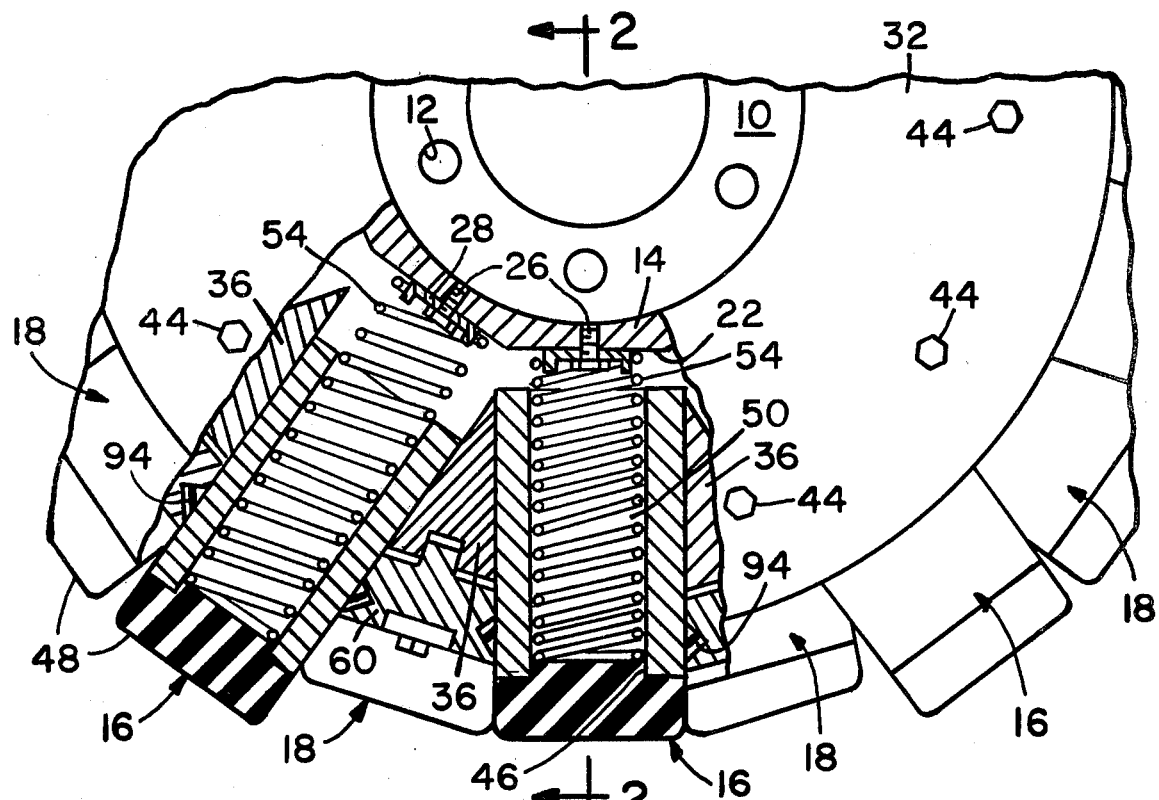
FIG. 1 is a fragmentary elevation of a portion of a wheel that embodies the present invention with parts broken away to reveal in detail two of the spring operated feet.
Figure 3:
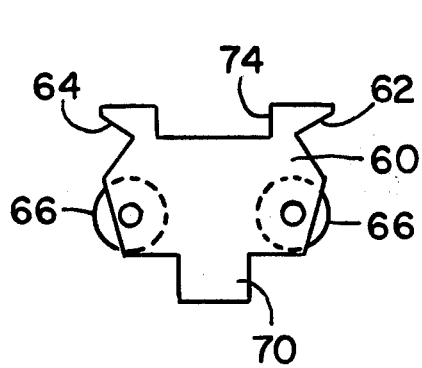
FIGS. 3, 4 and 5 are side elevational, front elevational and top views, respectively, of a locking and roller assembly.
Figure 4:
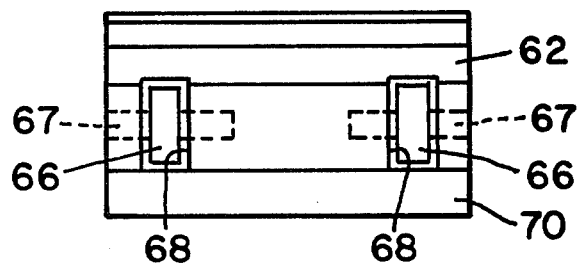
Figure 5:
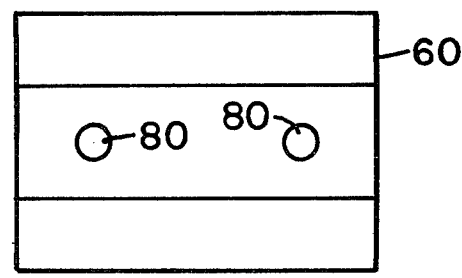
Figure 6:
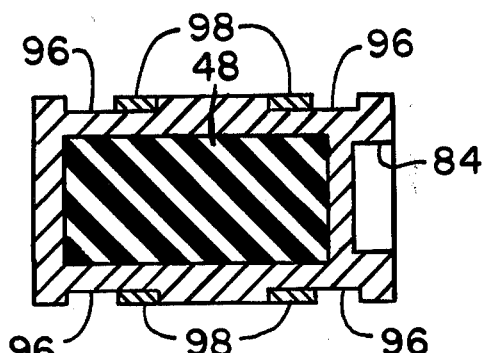
FIG. 6 is a cross-sectional view taken along lines 6—6 of FIG. 2.
Figure 2:
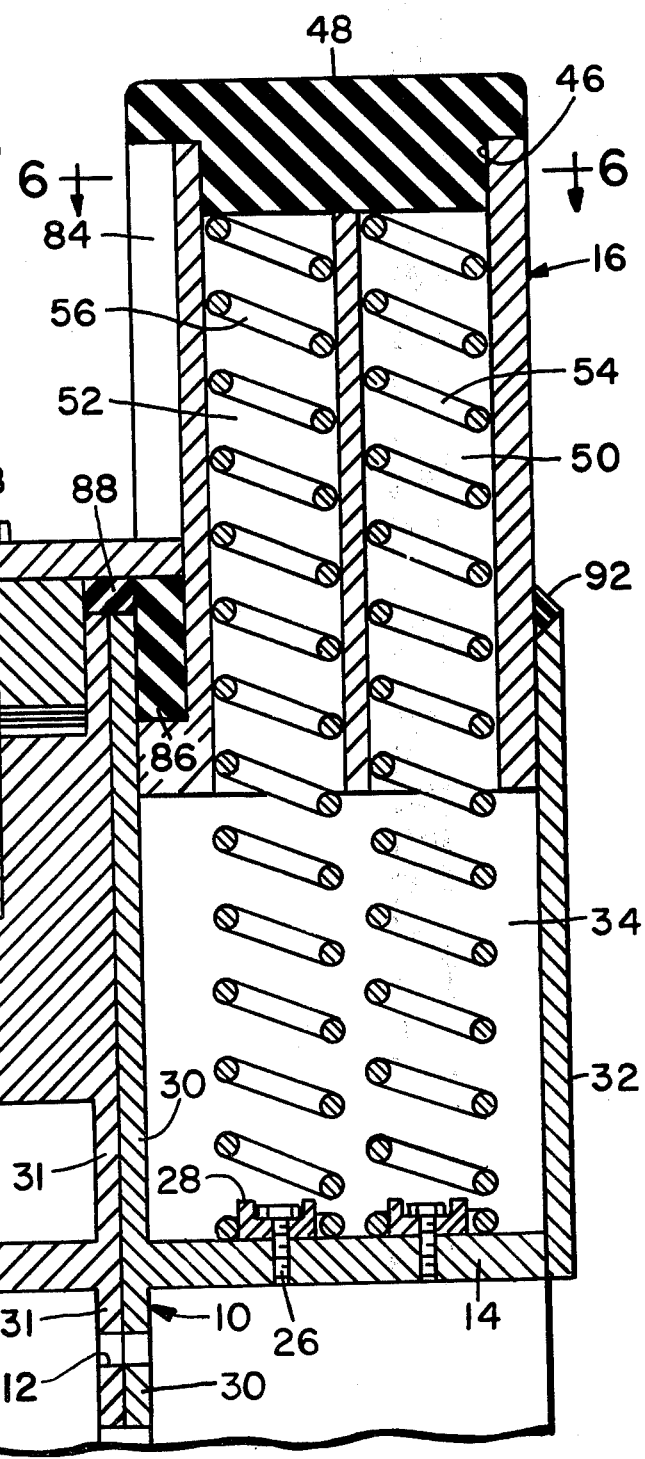
FIG. 2 is a view taken along lines 2—2 of FIG. 1. For the sake of clarity, only those portions of the wheel that are located in the plane of the cross-section are illustrated.

Referring to FIGS. 1 and 2 there is shown a wheel comprising a hub 10 having a plurality of apertures 12 which are adapted to receive the lugs from the brake housing to which the wheel is to be attached. Hub 10 is centrally disposed within cylinder 14, with which one set of feet 16 are associated, and a similar cylinder 15, with which a second set of feet 18 are associated. The feet are arranged in circumferential rows, the feet in each row being staggered with respect to the feet in adjacent rows. Any desired number of rows may be employed, but only two rows are illustrated in the drawings. The staggered, dual tread feature reduces vibration that is prevalent in the operation of wheels having a single tread row. Furthermore, additional tread rows afford greater traction in mud, snow, sand and the like. Whereas the inner surfaces of cylinders 14 and 15 may be circular, the outer surfaces are polygonal, the flat surfaces 22 thereof receiving flanged washers 28 which are secured by bolts 26.

Hub 10 is formed by the inner portions of disks 30 and 31. Disk 30 forms, along with a disk 32, the side walls of chambers 34. The remaining two sidewalls of each chamber 34 are formed by triangularly-shaped members 36 which may be secured to inner disk 30 by any suitable means such as welds, bolts or the like, or they may be cast integrally with the inner disk in the manner illustrated. A second outer disk 38 forms with a further plurality of triangularly-shaped members 40 the chambers for the second circumferential row of feet 18. Disks 32 and 38 are secured to members 36 and 40, respectively, by bolts 44. Disks 30 and 31 may be formed as a unitary structure, or they may be secured together by suitable means such as riviting, bolting or welding. Feet 16 are guided in chambers 34, the opposite walls of the chambers being parallel and closely engaging the adjacent walls of the feet. Disks 32 and 38, when bolted to triangularly-shaped members 36 and 40, reinforce those members against possible breakage during application of brakes. Disks 32 and 38 can be easily removed to clean out or lubricate interior components. One of the disks 32 or 38 may be extended radially inwardly to function as the hub where vehicle brake drum design does not permit attachment of the wheel to inner hub 10.

Each foot is provided with a plurality of longitudinally extending cylindrical bores 50 and 52 in which are located springs 54 and 56. The ends of the springs which protrude from bores 50 and 52 are positioned by flanged washers 28. Any number of springs may be employed in the feet. Also, a spring may be located within another spring to increase load bearing capacity.

The outwardly extending ends of the feet are provided with a recess 46 into which tread blocks 48 are molded. The rough surfaces of the foot which engage the tread blocks cause them to strongly adhere to the feet. The length of the springs are such that they contact the tread blocks, and they are slightly compressed when the foot is in its fully extended position. To provide a greater retaining force, the tread blocks could be provided with integrally molded brackets which bolt to the feet, or bolts could extend through the sides of the feet and into the tread blocks. Worn tread blocks 48 can be resurfaced by a vulcanizing process. For ease of assembly and replacement of worn parts, the feet are locked in place in the following manner. Each triangularly-shaped member 36 and 40 is provided with a slot 72 which receives a key 70 which protrudes from the bottom of locking member 60. This interlocking construction prevents member 60 from twisting and increases the strength of the combination of the triangularly-shaped and locking members. In that side of locking member 60 opposite key 70 is a slot 74 which receives locking plate 76. Bolts 78 extend through plate 76 and member 60 and into threaded bores in triangular members 36 and 40. Each foot has a locking slot 84 which extends along most of the length thereof. A resilient stop 86 of hard rubber, plastic or the like is situated at the bottom of slot 84 where it rests against the slot wall. After a foot is inserted into its respective chamber 34, its springs 54 and 56 are slightly compressed while plate 76 is bolted in place, whereby the end of the rod is adjacent an end of stop 86. A foot is easily removed by removing bolts 78 and steel plate 76 which is situated in slot 84 of the particular foot. Thus, for example, a broken spring could be replaced in a few minutes.

The front and rear edges of locking member 60 are provided with slots 68 which receive rollers 66 that are mounted on axles 67 which fit tightly in bores in member 60. The rollers, which can be made of stainless steel, nylon, or the like, ride in slots 96 in the front and rear side walls of the feet to reduce friction. Slots 96 are also provided with strips 98 of stainless steel, teflon or the like which reduce the wear on the adjacent surfaces of the feet. As wear occurs, some play may develop between rollers 66 and slots 96. A plurality of shims 82 are therefore placed in slot 72 before key 70 is inserted therein or preferably between the two bottom edges of member 60 adjoining key 70 and the adjacent top surface of the triangularly-shaped member. By removing one of the shims from each of the one or more stacks of shims, member 60 is moved to a position of smaller radius, whereby rollers 66 once more occupy the entire depth of slots 96, and the play is eliminated.

The wheel may be provided with a plurality of rubber seals which retard the entry of extraneous material such as mud, stones and the like into the operating mechanism of the wheel. Seals 90 and 92 are located at the outer beveled edges of disks 38 and 32, respectively, where they abut against the outer sides of the feet. Locking member 60 is provided with V-shaped grooves 62 and 64 which receive seals 94 that abut against the front and rear surfaces of the feet. An annular seal 88 of rectangular cross-section, which is located at the outer periphery of disks 30 and 31, provides a seal at the inner sides of the feet.

As the wheel revolves, successive feet come into action so that an adequate traction surface is always available, the wheel readily adapting itself automatically to the surface over which it travels. When it contacts an obstruction such as a stone, the foot is automatically forced inwardly to a greater extent, thus absorbing the shock of passing over such obstruction. This operation is illustrated in FIG. 1 wherein one of the sectioned feet 16 is illustrated as being deflected, whereas the other sectioned foot is shown in its undeflected position. Springs 54 and 56 normally act to force the feet outwardly from the hub, thus maintaining the periphery of the tread blocks in a substantially circular arc, the outer limit of the tread blocks being maintained by the engagement of rod 76 with stop 86 which absorbs or cushions the impact between rod 76 and the end wall of slot 84. In this position of foot 16, the springs are under slight compression.

I claim:

1. In a vehicle wheel of the type comprising
   a hub,
   means defining a plurality of chambers equally spaced around said hub,
   a foot disposed in each of said chambers and being capable of radial movement,
   means for restricting movement of each of said feet beyond a predetermined distance from said hub so that those portions of said feet remote from said hub tend to lie in a substantially circular arc, and
   at least one spring disposed between each foot and said hub, one end of each spring being disposed within said foot and forcing it outwardly,
   characterized in that
   each of said chambers comprises two opposed planar side walls, the front and rear chamber walls comprising triangularly-shaped members, a planar surface of each triangularly-shaped member being contiguous with a wall of an adjacent foot, and
   in that said movement-restricting means comprises
   a locking slot in a side wall of each foot, said locking slot having an end wall,
   a plate bolted to said wheel and extending into said locking slot, and
   a locking member situated on the outer surface of each triangularly-shaped member, said plate being situated in a locking plate slot in the outer surface of said locking member.

2. A wheel in accordance with claim 1 wherein the inner surface of each locking member has a centrally located key which is situated in a correspondingly-shaped slot in the outer surface of the adjacent triangularly-shaped member.

3. A wheel in accordance with claim 2 wherein said plate is bolted to said triangularly-shaped member through said locking member.

4. A wheel in accordance with claim 3 wherein the front and rear surfaces of each foot are provided with at least one longitudinally-extending roller slot, the adjacent surface of each locking member having a slot in which there is situated a roller which is rotationally mounted and which rides in the adjacent roller slot.

5. A wheel in accordance with claim 4 further comprising means for adjusting the height of said locking member.

6. A wheel in accordance with claim 5 wherein said height adjusting means comprises a plurality of shims disposed between said triangularly-shaped member and said locking member.

7. A wheel in accordance with claim 1 further comprising resilient means in said locking slot for absorbing the impact of said plate against the end wall of said slot.

8. A wheel in accordance with claim 7 wherein said resilient means comprises a solid block of resilient material.

* * * * *